US 6,721,841 B2

(12) United States Patent
Fukuzawa et al.

(10) Patent No.: US 6,721,841 B2
(45) Date of Patent: *Apr. 13, 2004

(54) HETEROGENEOUS COMPUTER SYSTEM, HETEROGENEOUS INPUT/OUTPUT SYSTEM AND DATA BACK-UP METHOD FOR THE SYSTEMS

(75) Inventors: Yasuko Fukuzawa, Yokohama (JP); Akira Yamamoto, Sagamihara (JP); Toshio Nakano, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/326,978

(22) Filed: Dec. 24, 2002

(65) Prior Publication Data
US 2003/0088720 A1 May 8, 2003

Related U.S. Application Data

(63) Continuation of application No. 09/594,012, filed on Jun. 15, 2000, now Pat. No. 6,529,976, which is a continuation of application No. 09/052,985, filed on Apr. 1, 1998, now Pat. No. 6,098,129.

(30) Foreign Application Priority Data
Apr. 1, 1997 (JP) .............................. 9-098389

(51) Int. Cl.[7] ................. G06F 12/00; G06F 13/00; G06F 15/16
(52) U.S. Cl. ............... 711/100; 710/3; 710/8; 710/9; 710/20; 710/36; 710/38; 710/268; 709/200; 709/201; 709/217; 709/218; 709/216; 709/238; 709/239; 709/245; 709/250; 711/111; 711/112; 711/150; 711/165; 711/200; 711/202; 711/205; 711/206; 711/207; 711/221
(58) Field of Search .............. 710/3, 8, 9, 15, 710/20, 21, 36, 38, 268; 709/200–203, 216–219, 238, 239, 240, 242, 245, 249, 250; 711/100, 111, 112, 150, 151, 161, 162, 165, 200, 202, 203, 205, 206–209, 220, 221

(56) References Cited

U.S. PATENT DOCUMENTS
4,768,150 A 8/1988 Chang et al.
(List continued on next page.)

FOREIGN PATENT DOCUMENTS
JP 04-326420 11/1992
JP 07-152491 6/1995

OTHER PUBLICATIONS
IBM Technical Disclosure Bulletin, vol. 38, No. 06, Jun. 1995, "High Performance Cooperative Count Key Data/Fixed Block Conversion Mechanism", pp. 333–335.
(List continued on next page.)

Primary Examiner—Jeffrey Gaffin
Assistant Examiner—Tanh Q. Nguyen
(74) Attorney, Agent, or Firm—Antonelli, Terry, Stout & Kraus, LLP

(57) ABSTRACT

A heterogeneous computer system, a heterogeneous input/output system and a data back-up method for the systems. An I/O subsystem A for open system and an I/O subsystem B for a mainframe are connected by a communication unit. In order to back up the data from at least a disk connected to the I/O subsystem B in a MT library system and in order to permit the mainframe to access the data in the I/O subsystem B, the I/O subsystem A includes a table for assigning a vacant memory address in a local subsystem to the memory of the I/O subsystem for an open system. A request of variable-length record format received from the mainframe is converted into a fixed-length record format for the subsystem B. The disk designated according to the table is accessed, and the data thus obtained is sent to the mainframe and backed up in the back-up system.

24 Claims, 7 Drawing Sheets

U.S. PATENT DOCUMENTS

| | | | |
|---|---|---|---|
| 4,864,492 A | | 9/1989 | Blakely-Fogel et al. |
| 4,941,084 A | | 7/1990 | Terada et al. |
| 4,947,367 A | | 8/1990 | Chang et al. |
| 5,051,887 A | | 9/1991 | Berger et al. |
| 5,155,845 A | | 10/1992 | Beal et al. |
| 5,251,318 A | | 10/1993 | Nitta et al. |
| 5,261,080 A | | 11/1993 | Khoyi et al. |
| 5,313,617 A | | 5/1994 | Nakano et al. |
| 5,349,656 A | | 9/1994 | Kaneko et al. |
| 5,388,013 A | | 2/1995 | Nakamura |
| 5,394,534 A | | 2/1995 | Kulakowski et al. |
| 5,504,882 A | * | 4/1996 | Chai et al. ............ 714/5 |
| 5,530,819 A | | 6/1996 | Day, III et al. |
| 5,535,372 A | | 7/1996 | Benhase et al. |
| 5,546,536 A | * | 8/1996 | Davis et al. ............ 714/20 |
| 5,546,541 A | * | 8/1996 | Drew et al. ............ 709/240 |
| 5,568,628 A | | 10/1996 | Satoh et al. |
| 5,613,100 A | | 3/1997 | Anezaki |
| 5,630,092 A | | 5/1997 | Carreiro et al. |
| 5,655,140 A | | 8/1997 | Haddock |
| 5,664,144 A | | 9/1997 | Yanai et al. |
| 5,680,580 A | * | 10/1997 | Beardsley et al. ............ 714/6 |
| 5,680,640 A | | 10/1997 | Ofek et al. |
| 5,692,155 A | | 11/1997 | Iskiyan et al. |
| 5,708,828 A | | 1/1998 | Coleman |
| 5,721,957 A | | 2/1998 | Huang et al. |
| 5,724,542 A | | 3/1998 | Taroda et al. |
| 5,734,818 A | | 3/1998 | Kern et al. |
| 5,745,789 A | * | 4/1998 | Kakuta ............ 710/21 |
| 5,758,125 A | | 5/1998 | Misinai et al. |
| 5,778,189 A | | 7/1998 | Kimura et al. |
| 5,812,843 A | | 9/1998 | Yamazaki et al. |
| 5,835,939 A | | 11/1998 | Kurokawa et al. |
| 5,860,088 A | | 1/1999 | Benhase et al. |
| 5,875,479 A | | 2/1999 | Blount et al. |
| 5,884,310 A | | 3/1999 | Brichta et al. |
| 5,886,841 A | | 3/1999 | Kikuchi et al. |
| 5,903,913 A | * | 5/1999 | Ofer et al. ............ 711/156 |
| 5,978,890 A | | 11/1999 | Ozawa et al. |
| 6,009,498 A | | 12/1999 | Kumasawa et al. |
| 6,041,391 A | | 3/2000 | Kanda et al. |
| 6,044,444 A | | 3/2000 | Ofek |
| 6,073,209 A | | 6/2000 | Bergsten |
| 6,081,826 A | | 6/2000 | Masuoka et al. |
| 6,098,129 A | * | 8/2000 | Fukuzawa et al. ............ 710/65 |
| 6,108,748 A | | 8/2000 | Ofek et al. |
| 6,115,797 A | | 9/2000 | Kanda et al. |
| 6,529,976 B1 | * | 3/2003 | Fukuzawa et al. ............ 710/65 |

OTHER PUBLICATIONS

IBM Technical Disclosure Bulletin, vol. 35, No. 3, Aug. 1992, "Centralized and Rapid Backup/Restore For Work Lan File Services/VM", pp. 286–289.

Fujitsu Scientific & Technical Journal 31 (1995) Jun., No. 1, Kawasaki, JP "Storage Management Software for Mainframe and UNIX", By: Keiji Suzuki, et al. pp. 36–44.

Gelb, "System–managed storage," IBM Systems Journal, vol. 28, No. 1, 1989, pp. 77–103.

* cited by examiner

HETEROGENEOUS COMPUTER SYSTEM, HETEROGENEOUS INPUT/OUTPUT SYSTEM AND DATA BACK-UP METHOD FOR THE SYSTEMS

CROSS-REFERENCE TO RELATED APPLICATIONS

This application is a continuation of U.S. application Ser. No. 09/594,012, filed Jun. 15, 2000, which is now U.S. Pat. No. 6,529,976 which is a continuation of 09/052,985 filed Apr. 1, 1998, which is now U.S. Pat. No. 6,098,129.

BACKGROUND OF THE INVENTION

The present invention relates to a heterogeneous computer system comprising a host computer and a plurality of I/O subsystems, and more in particular to a method for making it possible to back up the data stored in a memory between a host computer and an I/O subsystem which cannot be directly connected due to the difference in access interface, and a heterogeneous computer system including a plurality of I/O subsystems having different access interfaces connected to the system and the host computer.

In mainframes, a large scale of memory hierarchy (storage hierarchy) including a combination of a plurality of external memories having different processing speeds and different storage capacities is accompanied by a satisfactory data management function and an overall storage management function intended to support an optimum data arrangement and an efficient operation. The IBM's DFSMS (Data Facility Storage Management Subsystem) is an example, which is described in detail in "IBM SYSTEMS JOURNAL, Vol. 28, No. 1, 1989, pp. 77–103.

The disk data of the I/O subsystem of the mainframe computer system having the above-mentioned management function can be backed up in a medium such as a magnetic tape or a magnetic tape library capable of storing a large quantity of data with a low cost per bit.

An open system such as a personal computer or a work station, unlike the mainframe, is not equipped with a magnetic tape or a magnetic tape library capable of storing a large quantity of data.

Generally, in an open system such as a personal computer or a work station, a disk is accessed in accordance with a fixed-length record format, while the mainframe accesses a disk in accordance with a variable-length record format called the count key data format.

As a result, the disk subsystem for the mainframe computer is often configured independently of the disk subsystem for the open system.

On the other hand, a technique for transmitting and receiving data between I/O subsystems is disclosed in U.S. Pat. No. 5,155,845.

SUMMARY OF THE INVENTION

In a disk subsystem for an open system and a disk subsystem for a mainframe computer which use different host computers, the back-up and other functions are independently operated and managed.

In view of the fact that the open system lacks a medium such as a magnetic tape or a magnetic tape library capable of storing a larger quantity of data, as described above, it is effective to back up the data in the I/O subsystem of the mainframe.

An ordinary disk system for the open system, however, cannot be connected directly to the mainframe due to the difference in the interface thereof.

U.S. Pat. No. 5,155,845 fails to disclose how to process the read/write operation for a storage system not directly connected to a host computer.

SUMMARY OF THE INVENTION

An object of the present invention is to provide a method and a system for backing up data stored in a memory between a host computer and an I/O subsystem that cannot be connected directly to each other due to the difference in access interface.

Specifically, an object of the invention is to provide a method and a system for backing up data stored in an I/O subsystem of an open system from a mainframe not directly connected to the I/O subsystem.

Another object of the invention is to provide a method and a computer system in which a mainframe is capable of accessing a memory of an I/O subsystem of an open system not directly connected to the mainframe.

Still another object of the invention is to provide a system and a method of access in which two or more I/O subsystems having different interfaces can be connected to a mainframe.

In order to achieve the above-mentioned objects, according to one aspect of the present invention, there is provided a heterogeneous computer system comprising a first host computer, a first I/O subsystem directly connected to the first host computer by an interface of variable-length record format and including at least one external memory, a second host computer, a second I/O subsystem directly connected to the second host computer by an interface of fixed-length record format and including at least one external memory, and a communication unit for connecting the first I/O subsystem to the second I/O subsystem;

wherein the first I/O subsystem includes a table for storing a device address of an external memory, data indicating one of the external memory of the first I/O subsystem and the external memory of the second I/O subsystem to which the device address is assigned, and a device address of the external memory in the second I/O subsystem when the device address is assigned to the external memory of the second I/O subsystem; and wherein upon receipt of a read/write request conforming to the interface of variable-length record format from the first host computer and including an address of an external memory to be read from or written into, and upon decision, with reference to the table, that the external memory address included in the read/write request is assigned to the external memory included in the second I/O subsystem, the first I/O subsystem converts the read/write request into a second read/write request conforming to the interface of fixed-length record format and sends the second read/write request to the second I/O subsystem.

According to another aspect of the invention, there is provided a heterogeneous computer system comprising a first host computer, a first I/O subsystem directly connected to the first host computer by an interface of variable-length record format and including at least one external memory, a back-up system connected to the first host computer, a second host computer, a second I/O subsystem directly connected to the second host computer by an interface of fixed-length record format and including at least one external memory, and a communication unit for connecting the first I/O subsystem to the second I/O subsystem;

wherein the first host computer includes a means for issuing to the first I/O subsystem a read request conforming to the interface of variable-length record format and containing the address of an external memory from which data is to be read, and backing up the data received from the first I/o subsystem into the back-up system;

wherein the first I/O subsystem includes a table for storing the device address of an external memory, data indicating that one of the external memory of the first and the second I/O subsystems to which the device address is assigned, and the device address of the external memory in the second I/O subsystem when the first device address is assigned to the external memory of the second I/o subsystem; and wherein upon receipt from the first host computer of a read request conforming to the interface of variable-length record format including an external memory address to be read, and upon decision, with reference to the above-mentioned table, that the device address of the memory address included in the read request is assigned to the external memory included in the second I/O subsystem, the first I/O subsystem converts the read request into a second read request conforming to the fixed-length interface and sends the second read request to the second I/O subsystem while at the same time sending to the first host computer the data received from the second I/O subsystem.

According to still another aspect of the invention, there is provided a heterogeneous computer system comprising a first host computer, a first I/O subsystem directly connected to the first host computer by an interface of variable-length record format and including at least one external memory, a back-up system connected to the first host computer, a second host computer, a second I/O subsystem directly connected to the second host computer by an interface of fixed-length record format and including at least one external memory, and a communication unit for connecting the first I/O subsystem to the second I/O subsystem;

wherein the first host computer includes a means for issuing to the first I/O subsystem a write request conforming to the interface of variable-length record format including the address of an external memory into which data is to be written, and sending the data read from the back-up system to the first I/O subsystem;

wherein the first I/O subsystem includes a table for storing the device address of an external memory, data indicating that one of the external memory of the first and the second I/O subsystems to which the device address is assigned, and the device address of the external memory in the second I/O subsystem when the first device address is assigned to the external memory of the second I/O subsystem; and wherein upon receipt from the first host computer of a read request conforming to the interface of variable-length record format including the device address an external memory to be written into, and upon decision, with reference to the table, that the address of the external memory included in the write request is assigned to the external memory included in the second I/O subsystem, the first I/O subsystem converts the write request into a second write request conforming to the interface of fixed-length record format, sends the second read request to the second I/O subsystem while at the same time sending the data received from the first host computer to the second I/O subsystem.

According to yet another aspect of the invention, there is provided a heterogeneous I/O system for use with a host computer connected thereto, comprising a first I/O subsystem including at least one external memory, and a second I/O subsystem connected to the first I/O subsystem and including at least one external memory;

wherein the first I/O subsystem includes a table for storing a device address of an external memory, data indicating one of the external memories of the first and the second I/O subsystems to which the device address is assigned, and a device address of the external memory in the second I/O subsystem when the first device address is assigned to the external memory of the second I/O subsystem;

wherein upon receipt of a read/write request designating the device address of an external memory to be read from or written into by the host computer, and upon decision, with reference to the table, that the external memory address in the designated address is assigned to the external memory included in the second I/O subsystem, the first I/O subsystem sends the read/write request to the second I/O subsystem.

According to a further aspect of the invention, there is provided a heterogeneous I/O system for use with a host computer connected thereto, comprising a first I/O subsystem having an interface of variable-length record format and including at least one external memory, a second I/O subsystem having an interface of fixed-length record format and including at least one external memory, and a communication unit for connecting the first I/O subsystem to the second I/O subsystem;

wherein the first I/O subsystem includes a table for storing a device address of an external memory, data indicating one of the external memories of the first and the second I/O subsystems to which the device address is assigned, and a device address of the external memory in the second I/O subsystem when the first device address is assigned to the external memory of the second I/O subsystem; and wherein upon receipt from the host computer of a read/write request conforming to the interface of variable-length record format including the address of an external memory to be read from or written into, and upon decision, with reference to the table, that the external memory address included in the read/write request is assigned to the external memory included in the second I/O subsystem, the first I/O subsystem converts the read/write request into a second read/write request conforming to the interface of fixed-length record format and sends it to the second I/O subsystem.

According to an embodiment of the invention, there is provided a heterogeneous computer system, wherein an I/O subsystem for an open system is connected to an I/O subsystem for a mainframe by a communication unit, wherein, in order to access data in the I/O subsystem for an open system from the mainframe for enabling the data in the disk connected to the I/O subsystem for the open system to be backed up in a magnetic tape library system; a table is prepared for assigning a vacant address of the memory in the local subsystem to the memory of the I/O subsystem for the open system, wherein a request of variable-length record format received from the mainframe is converted into a request of fixed-length record format for the open system; wherein the disk designated according to the table is accessed, and wherein the data thus obtained is sent to the mainframe and backed up in the back-up system.

This configuration can back up the data of an I/O subsystem for an open system in a back-up system under the management of a mainframe not directly connected to the particular I/O subsystem.

DESCRIPTION OF THE PREFERRED EMBODIMENTS

Embodiments of the invention will be described below with reference to the accompanying drawings.

Figure 1:
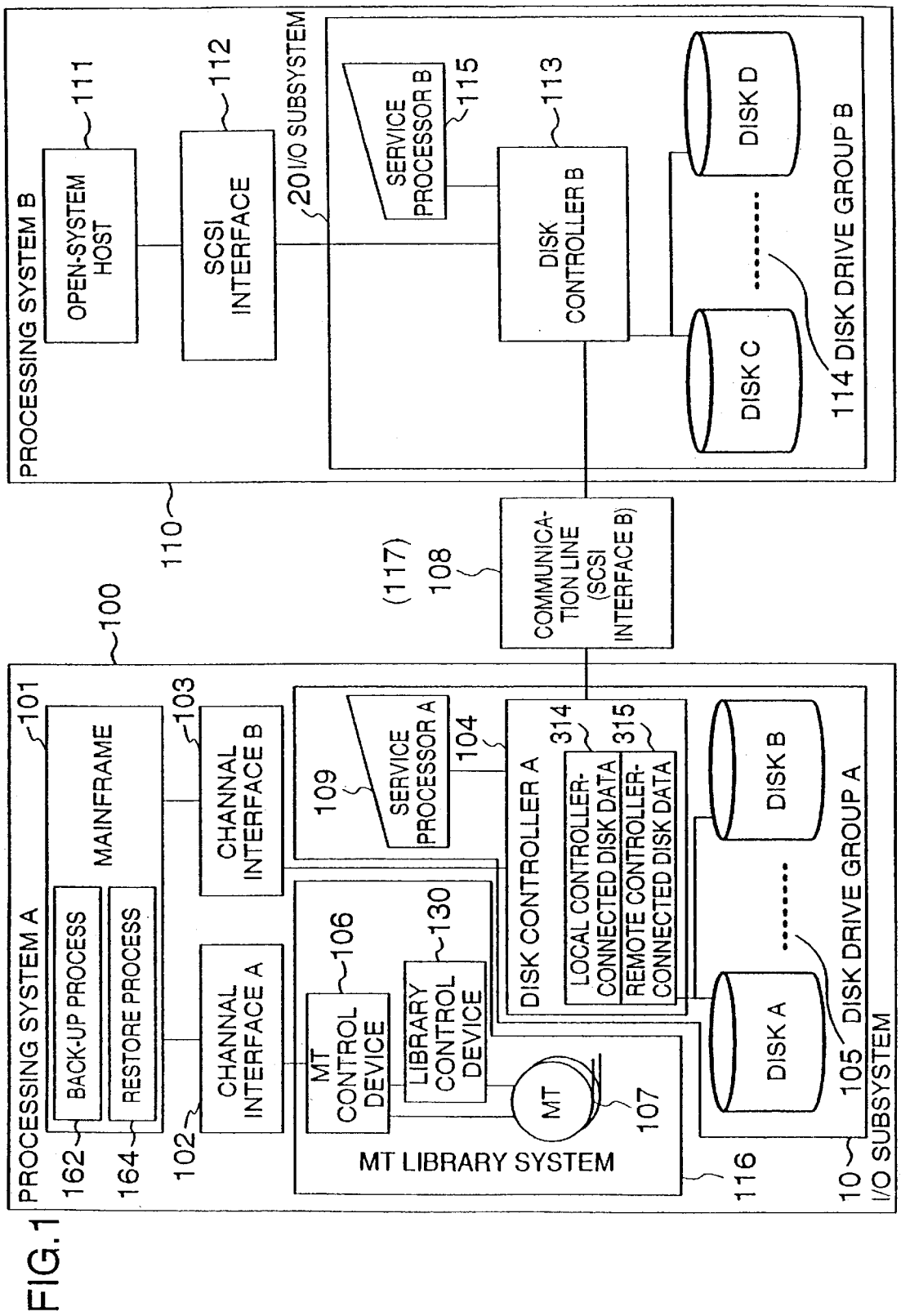
FIG. 1 is a block diagram showing a configuration of a heterogeneous computer system according to an embodiment of the present invention.

FIG. 1 is a diagram showing a configuration of a computer system according to an embodiment of the invention.

A processing system A 100 includes a mainframe 101, a channel interface A 102, a channel interface B 103, a magnetic tape (MT) controller 106, a magnetic tape library controller 130, a magnetic tape library 107, a disk controller A 104, a disk drive group A 105 and a service processor A 109. A back-up processing device 162 and a. restore processing device 164 are mounted on the mainframe 101.

The mainframe 101 accesses the disk controller A 104 through the channel interface B 103 conforming with a variable-length record format called the count-key-data format.

The count-key-data format is a record format in which a record constituting a unit of read/write operation is configured of three fields including a count field, a key field and a data field.

A record ID is stored in the count field, a key data for accessing the record is stored in the key field, and the data used by an application program is stored in the data field.

In the description that follows, the magnetic tape (MT) controller 106, the magnetic tape library controller 130 and the magnetic tape library 107 are collectively referred to as an MT library system 116. The disk controller A 104 and the disk drive group A 105 constitute an I/O subsystem 10 connected to the mainframe 101. In similar fashion, the disk controller B 113 and the disk drive group B 114 constitute an I/O subsystem 20 connected to a host 111 for an open system.

An optical disk or the like, as well as a magnetic disk, constitutes a rank of storage hierarchy connected through the channel interface. The following description refers to the case in which the MT library system 116 is connected.

The disk controller A 104 contains local controller-connected disk data 314 and remote controller-connected disk data 315.

The local controller-connected disk data 314 and the remote controller-connected disk data 315 are data provided for making it possible for the mainframe to access a disk device of the I/O subsystem not directly connected thereto. Specifically, the data 314 and 415 are a table for assigning a vacant address of the memory in the local I/O subsystem for the processing system A to the memory of the I/O subsystem for the open system so that the data in the I/O subsystem 20 for the processing system B can be accessed from the mainframe 101. The data 314 and 315 will be described in detail later.

The processing system B 110 includes a host 111 for the open system, a SCSI (small computer system interface) 112, the disk controller B 113, the disk drive group B 114 and a service processor B 115.

The host 111 for the open system accesses the disk controller B 113 through the SCSI 112 having a fixed-length record which is a unit of read/write operation.

The disk controller A 104 and the disk controller B 113 are connected by a communication line 108. The communication line 108 can be, for example, a SCSI cable B 117.

In the description that follows, the count-key-data format will be called the CKD format, and the fixed-length block format will be called an FBA (fixed block architecture) format.

Also, the record of the CKD format will be referred to as the CKD record, and the record of the FBA format will be referred to as the FBA record.

Figure 2:
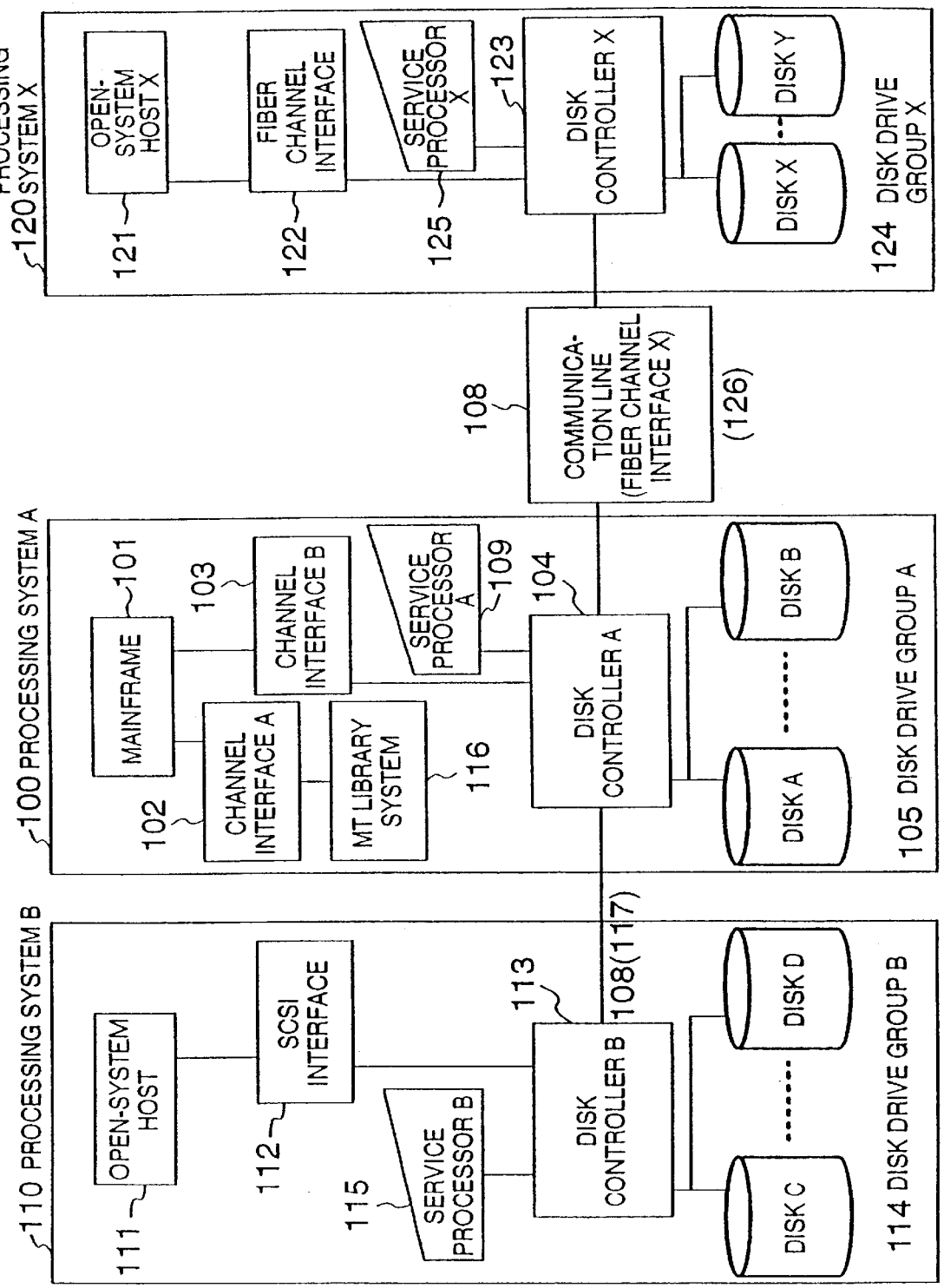
FIG. 2 is a block diagram showing a configuration of a heterogeneous computer system according to another embodiment of the invention.

FIG. 2 is a diagram showing another example of a computer system according to the invention, in which a single I/O subsystem for the mainframe is connected to two or more I/O subsystems for an open system.

In a processing system X 120, the interfaces of an open system host X 121 and a disk controller X 123 are connected to each other by a fiber channel interface 122. The fiber channel interface 122 is an optical fiber cable which can increase the length of connection between a host and a control device.

In many case, however, a fiber channel interface based on SCSI is employed between a host and a control device.

Also, an interface such as a fiber channel interface X 126 can be used to connect a disk controller X 123 and the disk controller B 113.

The data back-up system in the configuration of FIG. 2 is an expansion of the data back-up system in the configuration of FIG. 1.

The fundamental operation of each system is such that the mainframe 101 and the hosts 111 and 121 for the open system access the magnetic tape library 107 constituting an external memory or the disk drive group A 105, the disk drive group B 114 and the disk drive group X 124 through each interface.

The process in the mainframe 101 establishes a route to the data stored externally through each interface under the control of an arbitrary operating system such as Hitachi's VOS3 (virtual-storage operating system 3) for supporting the channel interface, while the process in the host for the open system establishes a route to the externally-stored data through each interface under the control of an arbitrary operating system such as UNIX (a registered trade mark owned by X/Open in U.S.A. and other countries) for supporting the SCSI.

Figure 3:
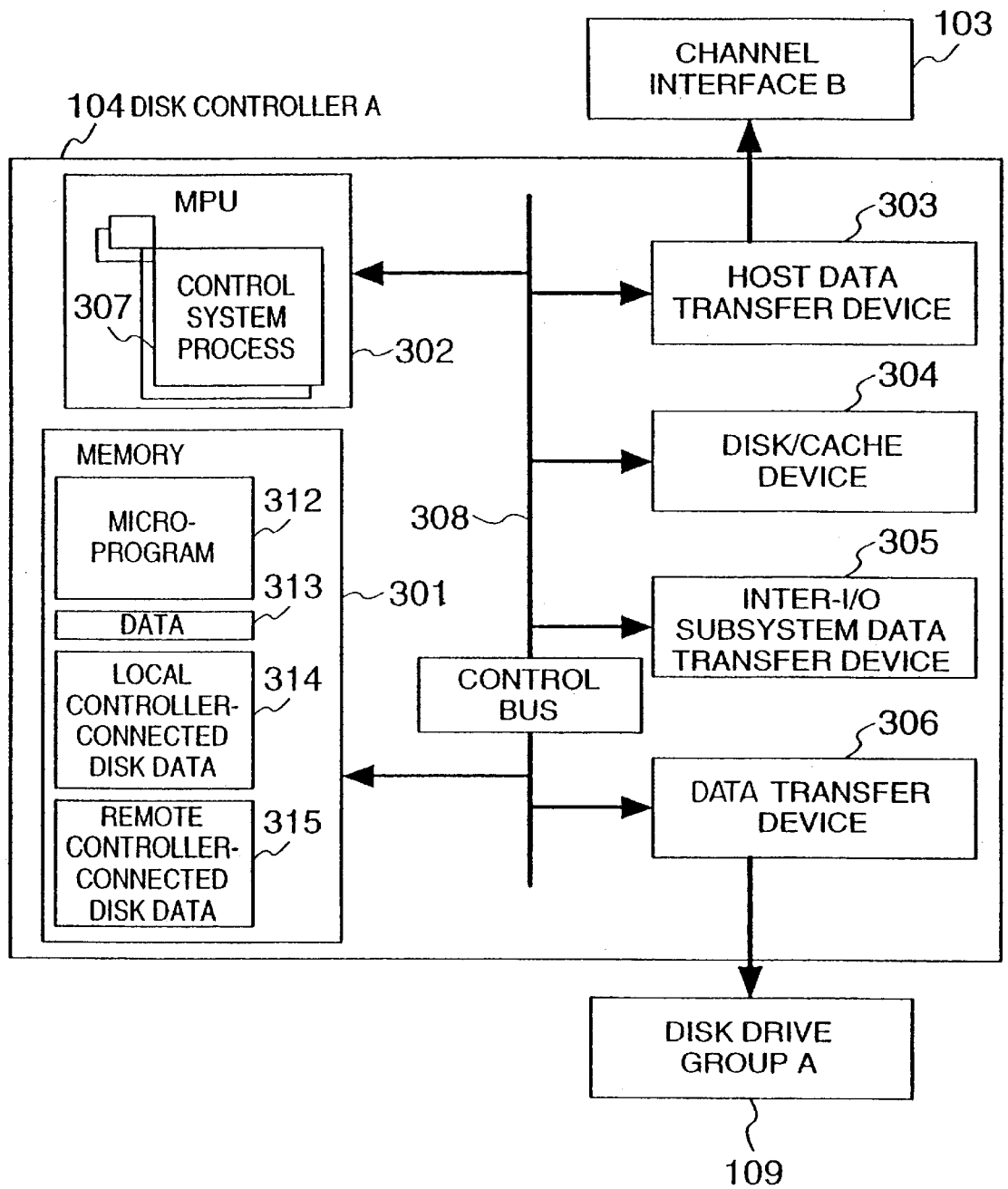
FIG. 3 is a block diagram showing a configuration of a disk controller of the heterogeneous computer system shown in FIGS. 1 and 2.

FIG. 3 is a diagram showing a configuration of the disk controller A 104.

The disk controller A 104 includes a MPU 302 for executing a control system process 307 of the disk controller, a memory 301, a host data transfer device 303, a disk/cache device 304, an inter-I/O subsystem data transfer device 305, a data transfer device 306 and a control bus 308 for connecting these devices.

The control system process 307 operates in a multitask or multiprocessor environment.

The memory 301 includes various microprograms 312 and various data 313.

Especially, the disk controller A 104 has stored therein the local controller-connected data 314 and the remote controller-connected disk data 315, as described above with reference to FIG. 1.

The disk controller B 113 and the disk controller X 123 have a configuration similar to the disk controller A 104 and will not be described in detail.

The disk controller B 113 and the disk controller X 123, however, are not required to contain the local controller-connected disk data 314 and the remote controller-connected disk data 315.

The local controller-connected disk data 314 is the data indicating the connections of the controllers and the like, and stored in the memory 301 of the disk controller A 104. The local controller-connected disk data 314 exists as the data corresponding to each disk device.

Figure 4:
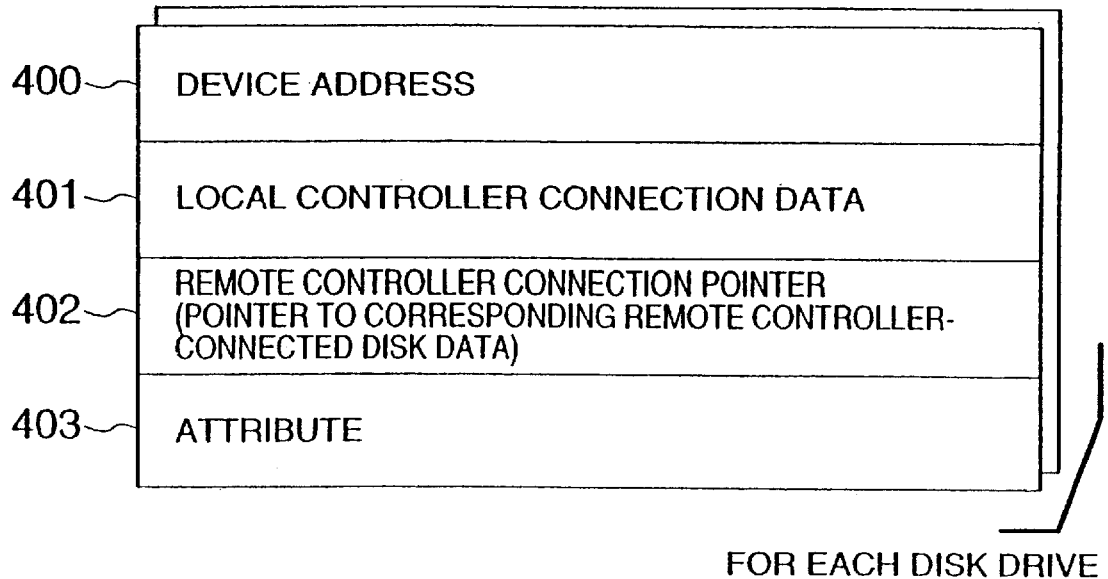
FIG. 4 is a diagram showing a configuration of a local controller-connected disk data (table) for the systems shown in FIGS. 1 and 2.

The local controller-connected disk data 314 is shown in FIG. 4.

The device address 400 is an identifier (ID) for discriminating a disk device to be read from or written into by a host computer such as the mainframe 101, and is the data also contained in the read/write request issued by the host computer such as the mainframe 101.

Local controller connection data 401 is the data indicating whether or not the disk drive corresponding to the controller-connected disk data 314 is actually connected to a controller.

A remote controller connection pointer 402 indicates whether or not the controller-connected disk data 314 is assigned to a disk drive connected to a remote controller.

In the case where the such data is assigned to a disk drive connected to a remote controller, the pointer indicates a corresponding remote controller-connected disk data 315. Otherwise, the pointer assumes a null value.

In the case where the remote controller connection pointer 402 is valid (i.e. in the case where the particular device address 400 is assigned to a disk device connected to a remote controller), it represents the state in which the local controller connection data 401 is not assigned.

In the case where the remote controller connection pointer 402 is invalid (i.e. in the case where the device address 400 is not assigned to a disk drive connected to a remote controller), on the other hand, the local controller connection data 401 may indicate the state of no-assignment.

In other words, the device address 400 may be assigned to neither a disk device connected to a local controller nor a disk device connected to a remote controller.

An attribute 403 is the data unique to a device including the interface, the function, the data format and the block length of the disk drive.

Figure 5:
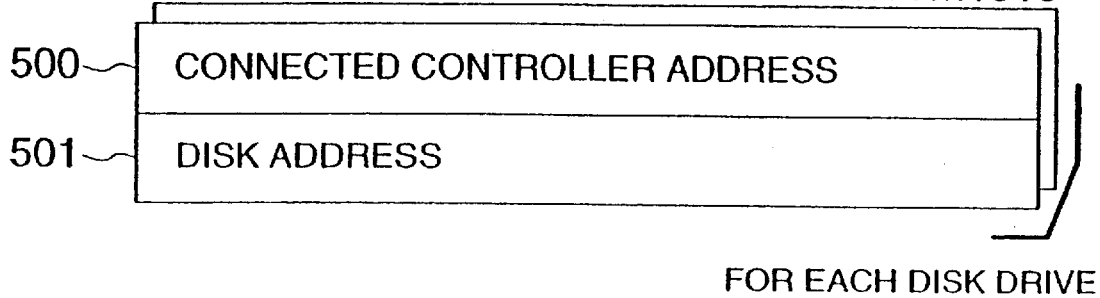
FIG. 5 is a diagram showing a configuration of a remote controller-connected disk data (table) for the systems shown in FIGS. 1 and 2.

The local controller-connected disk data 315 shown in FIG. 5 is the data corresponding to a disk drive not directly connected to the disk controller A 104.

It follows therefore that the remote controller-connected disk data 315, on the other hand, is pointed to by any one of the local controller-connected disk data 314.

A connection controller address 500 represents the address of a controller connected with a disk device corresponding to the remote controller-connected disk data 315. According to this embodiment, the address of the disk controller B 113 is stored as the connection controller address 500.

A disk address 501 represents the address assigned in the controller actually connected to a corresponding disk drive.

The local controller-connected disk data 314 and the remote controller-connected disk data 315 are set from the service processor 109.

Figure 6:
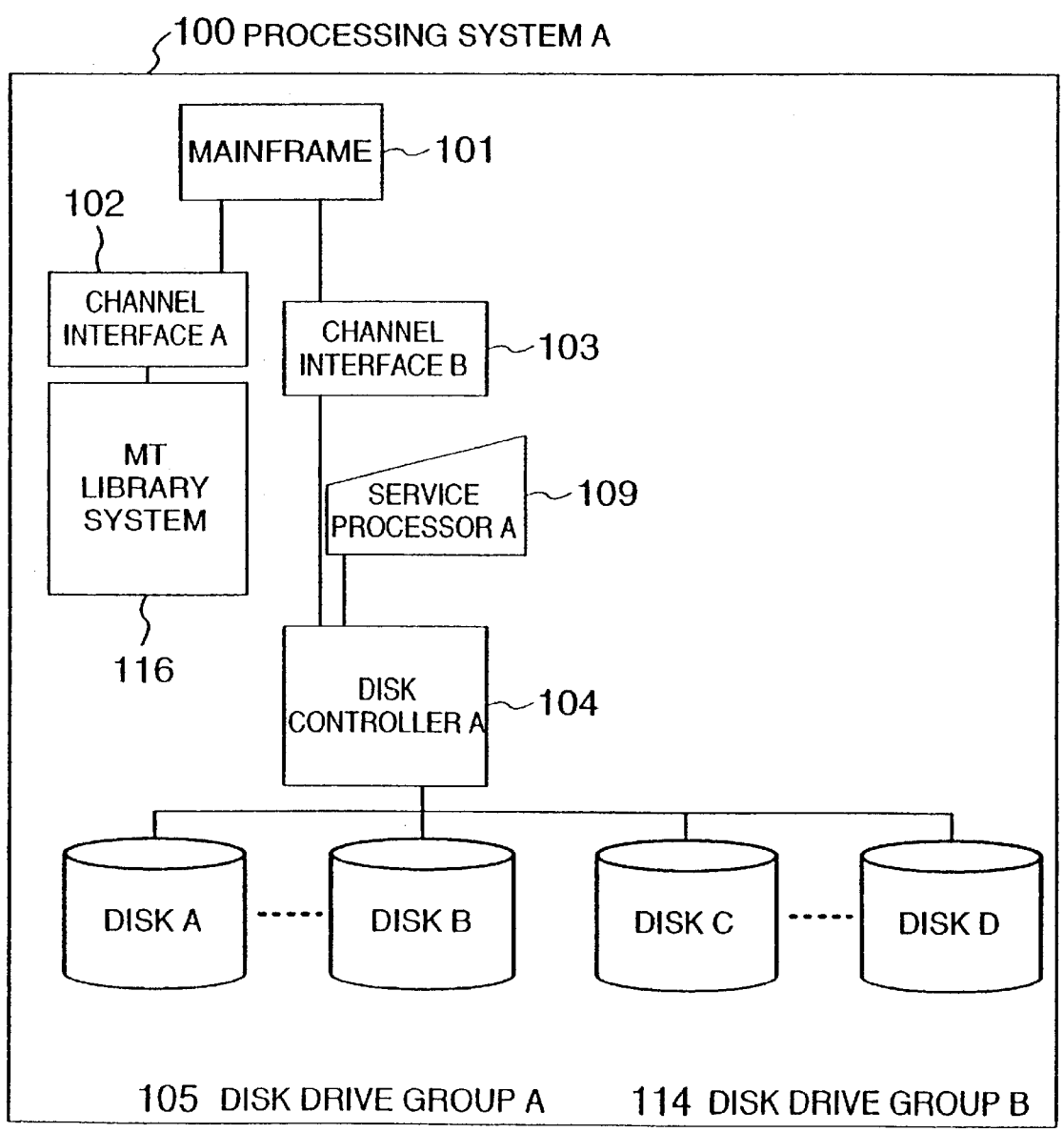
FIG. 6 is a diagram showing the interconnection of disk devices as viewed from the mainframe.

According to this embodiment, the mainframe 101 recognizes that the disk drive group B 114 (disks C and D) is also connected to the disk controller A 104 through the disk controller B 113, as shown in FIG. 6, taking advantage of the local controller-connected disk data 314 and the remote controller-connected disk data 315 shown in FIGS. 4 and 5.

This is because of the fact that the vacant address of disk drive available in the disk controller A 104 is assigned by the disk controller A 104 to a disk drive of the I/O subsystem for an open system.

Now, the back-up processing will be described with reference to FIGS. 1, 7 and 8.

Specifically, in FIG. 1 the back-up process 162 on the mainframe 101 causes the data in the disk device group B 114 of the open system of the processing system B to be backed up in the MT library system 116 through the disk controller A 104 and the mainframe 101 of the processing system A.

Conversely, the data backed up in the MT library system 116 is restored in the disk drive group B 114 of the open system of the processing system B through the mainframe 101 and the disk controller A 104 of the processing system A.

The back-up operation and the restoration described above are executed in response to a command from the mainframe 101.

First, an explanation will be given of the case in which the data in the disk drive group B 114 of the open system for the processing system B is backed up in the MT library system 116 through the disk controller A 104 and the mainframe 101 of the processing system A.

As already described above, the mainframe 101 has recognized that the disk drive group B 114 (disks C and D) are also connected to the disk drive A 104.

Therefore, the operation of the mainframe 101, which is simply to issue a read request to the disk controller A 104 and back up the received data in the MT library system 116, will not be described specifically.

In the case of backing up data into the MT library system 116, the mainframe 101 issues a read request to the disk controller A 104. The disk controller A 104 executes the process in accordance with the flowchart of FIG. 7 in response to a read request from the mainframe 101.

First, step 700 finds out a corresponding local controller-connected disk data 314 from the address of the disk drive designated in the read request.

Step 701 checks whether the designated disk drive is connected to the disk controller A 104 or not.

In the case where the disk drive is connected to the disk controller A 104, step 702 reads the corresponding data from the particular disk drive.

In the case where the disk drive is not connected to the disk controller A104, in contrast, step 703 checks whether the designated disk drive is connected to a remote disk controller (disk controller B 113). In other words, it checks whether the remote controller connection pointer 402 assumes a null value.

In the case where the check result shows that the remote controller connection pointer 402 assumes a null value indicating that the designated disk drive is not connected to the remote disk controller, an error is reported in step 704.

The operation specifically related to the invention is represented by step 705 and subsequent steps executed in the case where a designated disk drive is connected to a remote disk controller (disk controller B 113).

First, in the case where the check result shows that the remote controller connection pointer 402 does not assume the null value indicating that the designated disk drive is connected to a remote disk controller, step 705 finds out the remote controller-connected disk data 315 corresponding to the designated disk drive based on the remote controller connection pointer 402. Then, the address of the disk controller (disk controller B 113) actually connected to the designated disk drive and the address of the disk drive in the disk drive group B connected to the particular disk controller B 113 are acquired on the basis of the remote controller-connected disk data 315 found as above.

Then, step 706 converts the address of the data to be read which has been received in the read request into the format of the disk drive connected to the disk controller B 113.

In a read/write request from the mainframe 101, the address of data to be read or written is normally designated by the cylinder number, the head number and the record number according to the CKD format.

The record address expressed by the cylinder number, the head number and the record number will hereinafter be called CCHHR.

The disk drive connected to the disk controller B 113, on the other hand, has an access interface designated by LBA (logical block address) in accordance with the FBA format.

Consequently, step 706 converts the access address of the data to be read from CKD format to FBA format.

The conversion formula is given, for example, by $$LBA=(CC \times \text{number of heads} + HH) \times \text{track length} + \text{record number} \times \text{record length}$$

According to this embodiment, the disk controller A 104 and the disk controller B 113 may have the same interface, in which case the conversion of the input/output interface format is not required.

Step 707 issues a request to the disk controller B 113 to read the data from the area of the corresponding disk drive calculated in step 706.

Step 708 waits for the arrival of the requested data from the disk controller B 113.

Step 709 sends the data received from the disk controller B 113 to the main frame 101 thereby to complete the process.

The disk controller B 113 simply reads the data requested by the disk controller A 104 from a disk drive, and sends it to the disk controller A 104. This process, therefore, is not described specifically in the processing flow.

Next, an explanation will be given of a case in which data backed up in the MT library system 116 is restored by the restore process 164 on the mainframe 101 in the disk drive group B 114 of the open system of the processing system B through the disk controller A 104 and the mainframe 101 of the processing system A.

As described already above, the mainframe 101 has recognized that the disk drive group B 113 (disks C and D) are also connected to the disk controller A 104.

Therefore, no explanation will be given of the operation of the mainframe 101 which is simply to issue a write request to the disk controller A 104 to write the data read from the MT library system 116.

Figure 8:
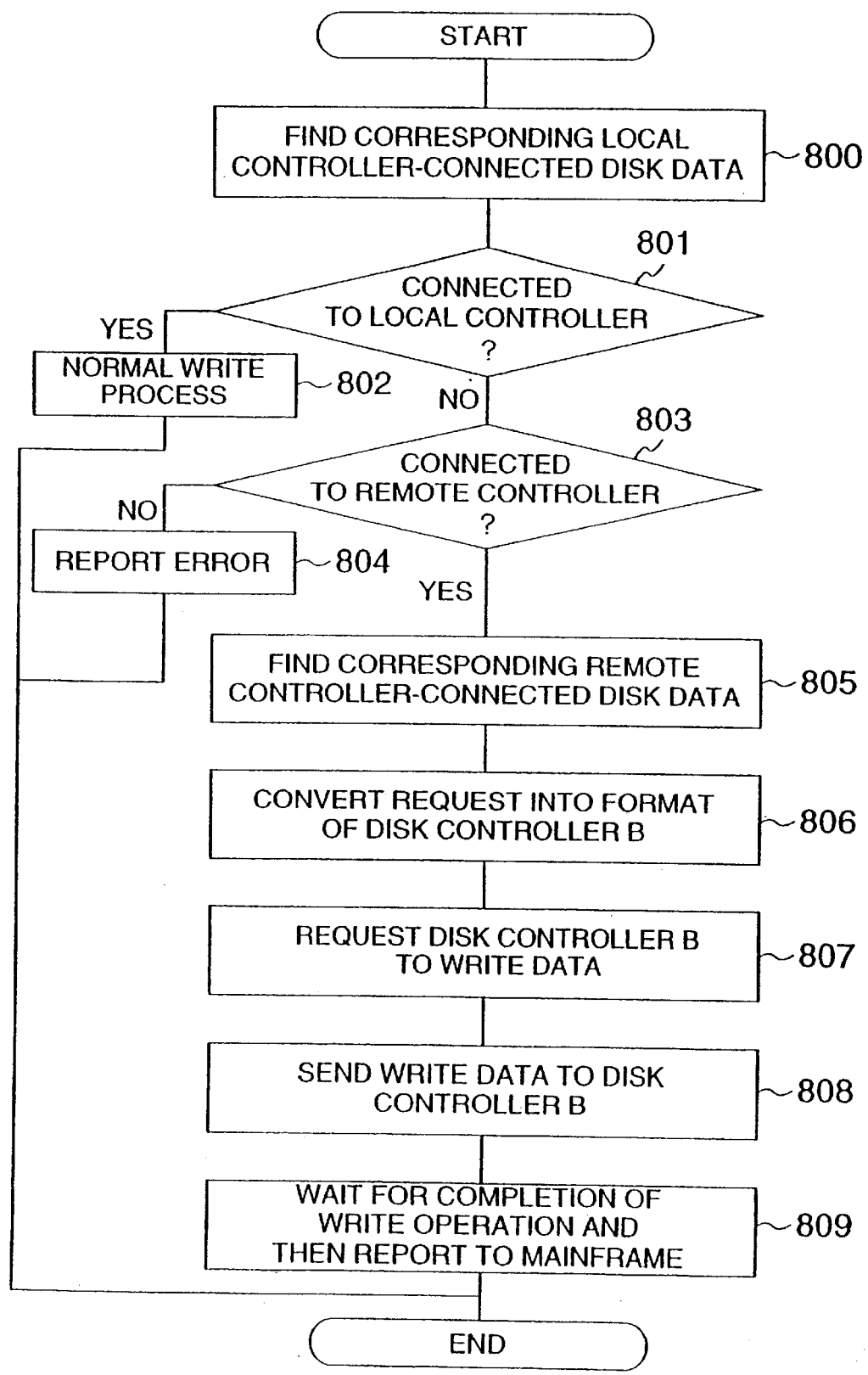
FIG. 8 is a diagram showing an example of the processing flow of a disk controller A in the case where data are restored in an I/O subsystem for an open system from an MT library system of the mainframe.

Upon receipt of a write request from the mainframe 101, the disk controller A 104 executes the process in accordance with the flowchart of FIG. 8.

Figure 7:
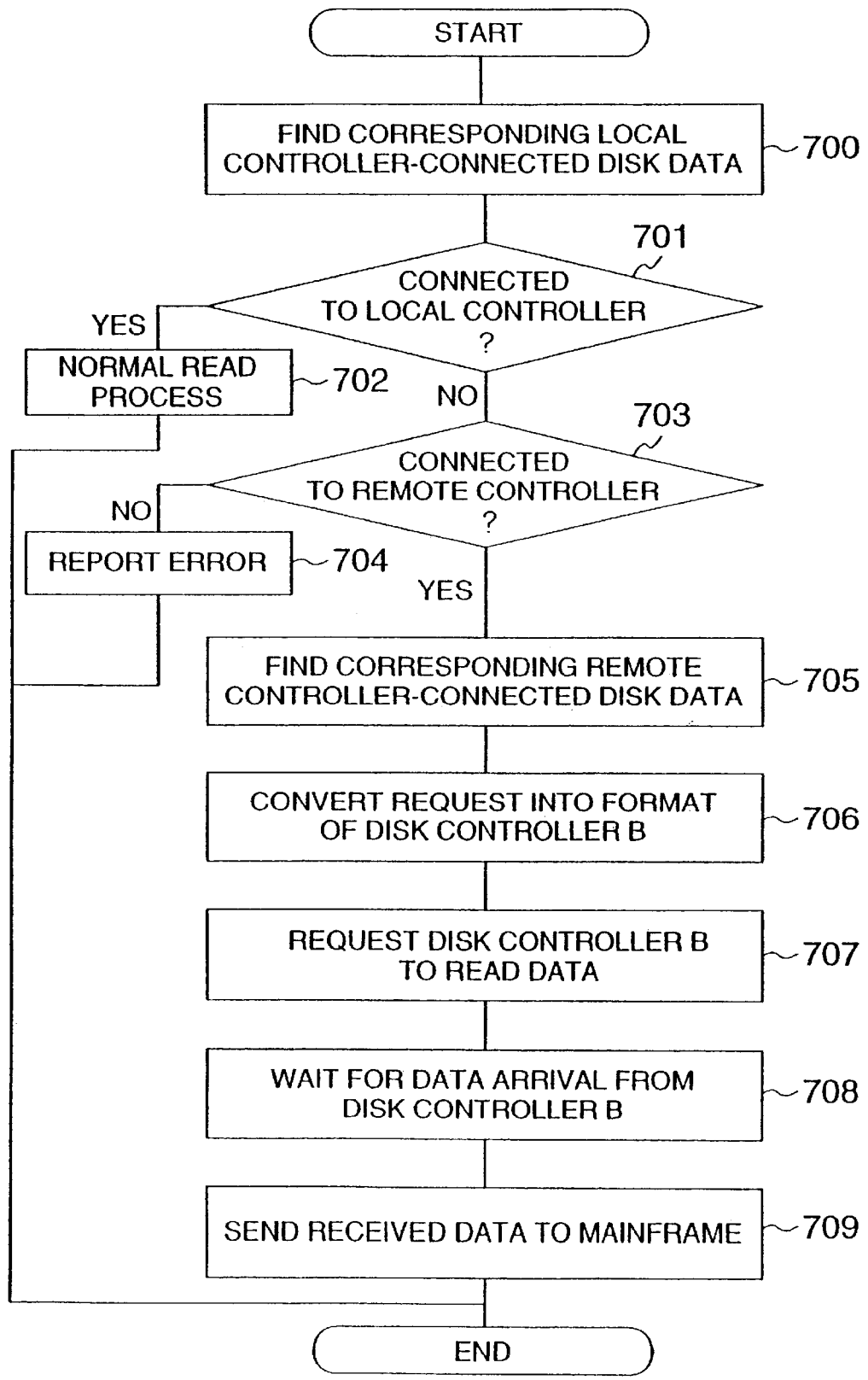
FIG. 7 is a diagram showing an example of the processing flow of a disk controller A in the case where the data in an I/O subsystem for an open system is backed up in an MT library system of the mainframe.

In the processing flow of FIG. 8, steps 800 to 801, 803 to 806 are similar to steps 700 to 701, 703 to 706 in FIG. 7, respectively, and therefore will not be explained. Also, step 802 is normally the write operation, since the request from the mainframe 101 is a write request. Only the parts different from FIG. 7 will be described below.

Step 807 issues a request to the disk controller B 113 to write data in the area of the corresponding disk drive calculated in step 807.

Next, in step 808, the write data is received from the mainframe 101 and sent to the disk controller B 113.

Then, step 809 waits for a report on the completion of the write request from the disk controller B 113, and upon receipt of the completion report, sends it to the mainframe 101 thereby to complete the process.

The disk controller B 113 simply reads the data requested by the disk controller A 104 from the corresponding disk drive and sends it to the disk controller A 104. The related processing flow, therefore, is not shown specifically.

The foregoing description concerns a system for backing up data of the disk drive group B 114 of the open system of the processing system B by the processing system A. As another embodiment, a heterogeneous I/O subsystem can be configured in which only the disk controller B and the disk drive group B are connected to the processing system A and the mainframe is connected with two I/O subsystems having different interfaces. In such a case, three or more instead of two I/O subsystems can be connected.

The above-mentioned embodiment permits data to be backed up between I/O subsystems having different access interfaces.

As a result, data stored in an I/O subsystem for an open system can be backed up into an I/O subsystem for the mainframe.

Also, the back-up mechanism of the mainframe includes a large-capacity, high-performance and high-reliability MT library system. The data of the I/O subsystem for an open system, therefore, can be backed up by a mainframe back-up mechanism high in performance and reliability.

Further, different I/O subsystems can be connected to the mainframe.

What is claimed is:

1. A system for storing data comprising:
a first storage system coupled to a host computer, said first storage system comprising a first disk controller, and at least one first disk coupled to said first disk controller; and
a second storage system coupled to said first storage system, said second storage system comprising a second disk controller, and at least one second disk coupled to said second disk controller;
wherein said first disk controller receives a write request issued from said host computer, determines if a disk designated by first disk identification information included in said write request is in said first storage system and, if the disk designated by said first disk identification information is not in said first storage system, obtains controller identification information designating said second disk controller and second disk identification information designating one of said at least one second disk based on said first disk identification information, and sends a write request to said second disk controller according to said controller identification information and said second disk identification information.

2. A system as claimed in claim 1, wherein said first disk controller stores correlation information among said first disk identification information, said controller identification information, and said second disk identification information, and converts said first disk identification information into said controller identification information and said second disk identification information based on said correlation information.

3. A system as claimed in claim 2, wherein said correlation information is set in said first disk controller by a service processor coupled to said first disk controller.

4. A system as claimed in claim 1, wherein said second disk identification information is identification information assigned to said second storage system.

5. A system as claimed in claim 1, wherein said first disk controller writes data to one of said at least one first disk according to said first disk identification information, if the disk designated by said first disk identification information is in said first storage system.

6. A system as claimed in claim 1, wherein said second disk controller has an interface for coupling to a computer.

7. A system as claimed in claim 6, wherein said second disk controller is coupled to said first disk controller via the same type of interface as said interface for coupling to a computer.

8. A system as claimed in claim 7, wherein said interface for coupling to a computer is according to Small Computer System Interface (SCSI).

9. A system for storing data comprising:
   a first storage system coupled to a host computer, said first storage system comprising a first disk controller, and at least one first disk coupled to said first disk controller; and
   a second storage system coupled to said first storage system, said second storage system comprising a second disk controller, and at least one second disk coupled to said second disk controller;
   wherein said first disk controller receives a write request issued from said host computer, and selects a disk controller coupled to a disk corresponding to first disk identification information included in said write request, and
   wherein said first disk controller obtains, if a selected disk controller is said second disk controller, controller identification information designating said second disk controller and second disk identification information designating one of said at least one second disk based on said first disk identification information, and sends a write request to said second disk controller according to said controller identification information and said second disk identification information.

10. A system as claimed in claim 9, wherein said first disk controller stores correlation information among said first disk identification information, said controller identification information, and said second disk identification information, and converts said first disk identification information into said controller identification information and said second disk identification information based on said correlation information.

11. A system as claimed in claim 10, wherein said correlation information is set in said first disk controller by a service processor coupled to said first disk controller.

12. A system as claimed in claim 9, wherein said second disk identification information is identification information assigned to said second storage system.

13. A system as claimed in claim 9, wherein said first disk controller writes data to one of said at least one first disk according to said first disk identification information, if the disk designated by said first disk identification information is in said first storage system.

14. A system as claimed in claim 9, wherein said second disk controller has an interface for coupling to a computer.

15. A system as claimed in claim 14, wherein said second disk controller is coupled to said first disk controller via the same type of interface as said interface for coupling to a computer.

16. A system as claimed in claim 15, wherein said interface for coupling to a computer is according to Small Computer System Interface (SCSI).

17. A system for storing data comprising:
   a first storage system coupled to a host computer, said first storage system comprising a first disk controller, and at least one first disk coupled to said first disk controller; and
   a second storage system coupled to said first storage system, said second storage system comprising a second disk controller, and at least one second disk coupled to said second disk controller;
   wherein said first disk controller receives a write request issued from said host computer, and chooses a disk controller from one of said first disk controller and said second disk controller that is coupled to a disk corresponding to first disk identification information included in said write request, and
   wherein said first disk controller obtains, if a chosen disk controller is said second disk controller, controller identification information designating said second disk controller and second disk identification information designating one of said at least one second disk based on said first disk identification information, and sends a write request to said second disk controller according to said controller identification information and said second disk identification information.

18. A system as claimed in claim 17, wherein said first disk controller stores correlation information among said first disk identification information, said controller identification information, and said second disk identification information, and converts said first disk identification information into said controller identification information and said second disk identification information based on said correlation information.

19. A system as claimed in claim 18, wherein said correlation information is set in said first disk controller by a service processor coupled to said first disk controller.

20. A system as claimed in claim 17, wherein said second disk identification information is identification information assigned to said second storage system.

21. A system as claimed in claim 17, wherein said first disk controller writes data to one of said at least one first disk according to said first disk identification information, if the disk designated by said first disk identification information is in said first storage system.

22. A system as claimed in claim 17, wherein said second disk controller has an interface for coupling to a computer.

23. A system as claimed in claim 22, wherein said second disk controller is coupled to said first disk controller via the same type of interface as said interface for coupling to a computer.

24. A system as claimed in claim 23, wherein said interface for coupling to a computer is according to Small Computer System Interface (SCSI).

* * * * *